United States Patent
Schuseil et al.

(10) Patent No.: US 8,968,131 B2
(45) Date of Patent: Mar. 3, 2015

(54) CHAIN FOR A TIMING DRIVE OR AN ASSEMBLY DRIVE OF A DRIVE DEVICE OF A MOTOR VEHICLE

(75) Inventors: Bolko Schuseil, Adelsdorf (DE); Antonius Luering, Gutenstetten (DE); Klaus Hahn, Fuerth-Burgfarrnbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 553 days.

(21) Appl. No.: 12/946,937

(22) Filed: Nov. 16, 2010

(65) Prior Publication Data
US 2011/0118069 A1    May 19, 2011

(30) Foreign Application Priority Data
Nov. 17, 2009    (DE) .................... 10 2009 053 597

(51) Int. Cl.
| F16G 13/02 | (2006.01) |
| F16G 13/04 | (2006.01) |
| F16G 13/08 | (2006.01) |

(52) U.S. Cl.
CPC ................ *F16G 13/04* (2013.01); *F16G 13/08* (2013.01)
USPC ......................................... 474/213; 474/206

(58) Field of Classification Search
USPC .................................................. 474/202, 213
See application file for complete search history.

(56) References Cited

U.S. PATENT DOCUMENTS

| 4,906,224 A * | 3/1990 | Reber ............................ 474/213 |
| 6,393,820 B1 * | 5/2002 | Varnam et al. ..................... 59/78 |
| 2002/0078675 A1 * | 6/2002 | Matsuda et al. ..................... 59/5 |
| 2002/0132690 A1 * | 9/2002 | Suzuki et al. ................ 474/212 |
| 2004/0166978 A1 * | 8/2004 | Matsuda et al. ............... 474/212 |
| 2005/0109428 A1 * | 5/2005 | Charton ........................ 148/319 |
| 2006/0199691 A1 * | 9/2006 | Matsui et al. ................. 474/212 |

FOREIGN PATENT DOCUMENTS

EP    0 385 681 B1    9/1990

* cited by examiner

*Primary Examiner* — William E Dondero
*Assistant Examiner* — Diem Tran
(74) *Attorney, Agent, or Firm* — Davidson, Davidson & Kappel, LLC

(57) ABSTRACT

A chain for a timing drive or an assembly drive of a drive device of a motor vehicle, which has a plurality of link packs articulatedly connected to one another and formed from middle links and cover links, with corresponding recesses through which chain pins or chain sleeves are inserted, and a plurality of inner links which connect the link packs to one another. At least the inner links and the middle links have different expansion behavior.

14 Claims, 1 Drawing Sheet

…

Figure 1:
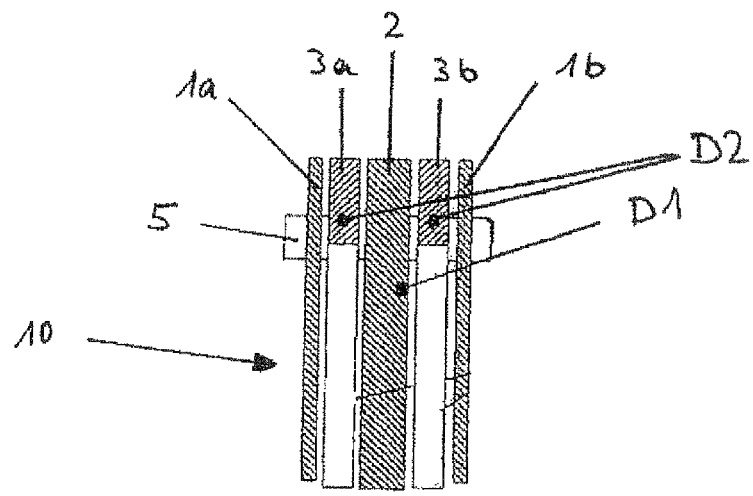

CHAIN FOR A TIMING DRIVE OR AN ASSEMBLY DRIVE OF A DRIVE DEVICE OF A MOTOR VEHICLE

This application claims the priority of DE 10 2009 053 597.7 filed Nov. 17, 2009, which is incorporated by reference herein.

FIELD OF THE INVENTION

The invention relates to a chain for a timing drive or an assembly drive of a drive device of a motor vehicle.

Such chains are used to transmit a rotational movement from a driving shaft, such as for example a crankshaft, to a driven shaft, such as for example a camshaft. The chains are formed from a multiplicity of link packs which are connected to one another in a rotatable manner and which in turn are composed of a plurality of links, such as for example middle links, inner links and/or cover links. The links are provided with corresponding recesses through which chain pins or chain sleeves are inserted, such that the links are connected to one another in a non-positively locking fashion. The middle links are preferably arranged on the chain pins or the chain sleeves for conjoint rotation therewith and serve to transmit force within the link pack, while the cover links are placed on from the outside and hold the link packs together. To connect the link packs, the inner links are provided which are held in a rotatable manner on the chain pins or chain sleeves. Depending on their tasks, the links may have different widths and lengths, wherein the geometry is self-evidently also co-determined by the toothing of the engaging sprocket.

The noises generated during the engagement of the sprocket into the chain are determined substantially by the engagement impulse and the tooth shape of the sprocket.

EP 0 385 681 B1 discloses a chain in which the links have a certain shape, as a result of which the spacing between the link packs varies. On account of the varying spacing, the elapsed time or the time duration of the periods of contact between tooth engagements differs, such that the associated noises are moved out of the resonance spectrum and are spread over a broad band.

A disadvantage of such a solution is that the assembly expenditure is relatively high because the links must be supplied in specific supply sequences during assembly. Furthermore, the tooling costs are increased because, on account of the different geometries of the links, different tools are required for producing said links.

It is therefore an object of the invention to create a chain which is cost-effective to produce and which generates a low level of noise during the engagement of the sprocket.

The basic concept of the invention can be considered that of at least the inner links and the middle links having different expansion behavior. On account of the different expansion behavior, as the link pack runs into the toothing of the sprocket, an elastic impact is generated, as a result of which the run-in of the chain into the sprocket takes place more softly overall, and the associated generation of noise is reduced. The different expansion behavior has the effect here that the links elastically deform to different extents under the same loading, and in this way the time intervals at which the links successively come into contact with the teeth of the sprocket vary.

Since the movement of the chain is a longitudinal movement, the effect is particularly pronounced if the different expansion behavior is formed from a different expansion in the longitudinal direction. Those links which exhibit relatively low expansion, that is to say are harder, serve to stiffen the chain, while the links which exhibit relatively high expansion generate the elastic impact.

Figure 2:
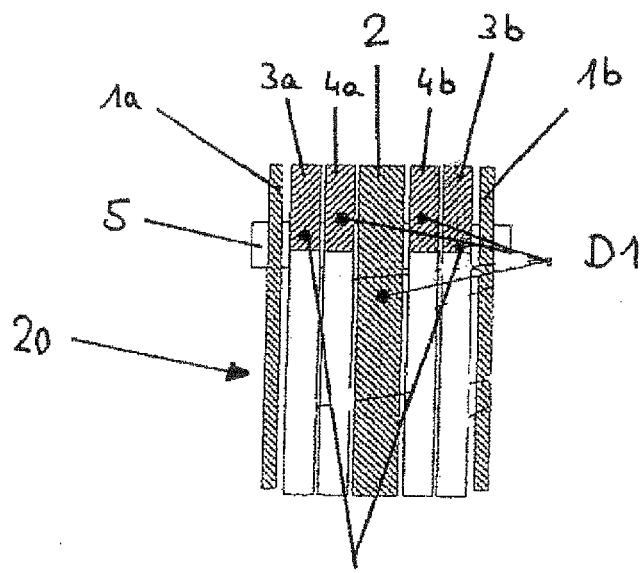

The invention is explained in more detail below on the basis of preferred exemplary embodiments. In the figures:

FIG. 1 shows a link pack of a chain having a middle link, two cover links and two inner links for connecting to a second link pack (not illustrated), and FIG. 2 shows a link pack of a chain having a middle link, two cover links and four inner links for connecting to a second link pack (not illustrated).

FIG. 1 shows a link pack 10 of a chain for a timing drive or an assembly drive of a drive device for a motor vehicle. Such chains are used as endless traction mechanisms between a driving shaft and a driven shaft, such as for example camshafts, crankshafts, the shaft of a water pump or of an air-conditioning compressor. Rotationally fixedly arranged on the shafts are sprockets which are provided with toothings with which the chain engages.

The link pack 10 is composed of a middle link 2 and two cover links 1a and 1b which cover the link pack 10 at the outside. The middle link 2 and the cover links 1a and 1b are provided in each case with corresponding recesses into which a chain pin 5 is inserted. The middle link 2 is connected to the chain pin 5 by means of a rotationally fixed connection, such as for example an interference fit, and serves to transmit force within the link pack 10. Also provided are inner links 3a and 3b which are likewise provided with recesses and which, by means of said recesses, are held on the chain pin 5 in a rotatable manner. The inner links 3a and 3b have the task of pivotably connecting the link pack 10 to an adjacent link pack (not illustrated) of the same design.

The middle link 2 and the inner links 3a and 3b have different expansion behavior, which is realized here by virtue of the expansion D1 of the middle link 2 being lower than the expansion D2 of the inner links 3a and 3b under the same loading. The different expansions D1 and D2 have the effect that the chain impacts elastically as it runs in on the sprocket, and the run-in is softer. In particular, in this way, a variation of the time intervals with which the teeth of the sprocket come into contact with the chain is realized, such that the noise generation is distributed over a broader frequency range, and the noise level is thereby dampened.

The different expansion behavior may for example be achieved in a very simple manner by virtue of different materials being used for the middle link 2 and the inner links 3a and 3b. It is thus possible, for example, to use a steel of the type C65 with a high strength for the middle link 2 and to use a steel of the type C45 with a lower strength for the inner links 3a and 3b. Alternatively, the different expansion behavior may also be obtained by means of heat treatment.

The advantage in using links with different expansion behavior according to the invention lies in the fact that the noise generation is dampened as a result of the variation of the time intervals, and the inner links and the middle links can nevertheless have an identical outer geometry and can thereby be produced using one and the same tool. Here, the expression "outer geometry" is to be understood to mean the outline shape of the links transversely with respect to the direction of force engagement; the thickness of the links may self-evidently differ.

FIG. 2 shows a further embodiment of the invention, in which it is possible to see a link pack 20 in which the inner links 3a and 3b have been supplemented by two further inner links 4a and 4b to the sides of the middle link 2. The inner links 4a and 4b exhibit the same expansion D1 as the middle link 2, and thereby stiffen the connection of the link pack 20 to an adjacent link pack. The inner links 3a,3b,4a and 4b thereby exhibit different expansions D1 and D2 under the same loading, which provides the effect described from FIG. 1. A further advantage which arises from the different expansions D1 and D2 is the fact that the forces between the link packs can be distributed more uniformly on the inner links 3a,3b,4a and 4b even if the chain pin 5 is bent.

The different expansion behavior of the links is to be understood to mean any measures which bring about a different expansion of the links for the same outer geometry or for a predefined outer geometry. In the case of different materials, this would for example be the difference in ductility of the materials. Alternatively, the different expansion behavior may also be realized by means of the individual design of the contour of the inner links 3a,3b,4a,4b and/or of the middle links 2 or else by means of the selection of corresponding thicknesses for the inner links 3a,3b,4a,4b and/or of the middle links 2. It is clear to a person skilled in the art that the advantage according to the invention may be obtained both by means of each proposed solution individually and also by means of any desired combination of the individual proposed solutions.

The invention claimed is:

1. A chain for a timing drive or an assembly drive of a drive device of a motor vehicle, comprising:
   a plurality of link packs articulatedly connected to one another and formed from middle links and cover links, with corresponding recesses through which chain pins or chain sleeves are inserted, the link packs including a first link pack consisting of a single middle link at a lateral center of the chain, a first cover link and a second cover link, and
   a plurality of inner links which connect the link packs to one another, the plurality of inner links including a first inner link laterally between the single middle link and the first cover link and a second inner link laterally between the single middle link and the second cover link,
   wherein at least the inner links and the middle links have different expansion behavior, wherein links having the different expansion behavior elastically deform to different extents under a same loading, and wherein the different expansion behavior is realized by different materials, wherein the different materials are steels in the range of C45 steel to C65 steel, wherein each middle link is rotationally fixedly connected to the respective chain pin or chain sleeve and each inner link is held to the respective chain pin or chain sleeve in a rotatable manner,
   wherein, under the same loading, the single middle link exhibits a lower expansion behavior than each of the first and second inner links.

2. The chain according to claim 1, wherein at least two inner links are provided for connecting two link packs, and the inner links have different expansion behavior.

3. The chain according to claim 1, wherein the different expansion behavior is further realized by means of heat treatment.

4. The chain according to claim 1, wherein the different expansion behavior is further realized by means of a different contour of the inner links and/or of the middle links.

5. The chain according to claim 1, wherein the different expansion behavior is further realized by means of a different thickness of the inner links and/or of the middle links.

6. The chain as recited in claim 1 wherein the first inner link is directly laterally adjacent to the first cover link and the second inner link is directly laterally adjacent to the second cover link.

7. The chain as recited in claim 6 wherein the plurality of inner links further include a third inner link directly laterally adjacent to the first inner link and the single middle link and a fourth inner link directly laterally adjacent to the second inner link and the single middle link.

8. The chain as recited in claim 7 wherein the third and fourth inner links each exhibit lower expansion behavior than each of the first and second inner links such that the first and second inner links each elastically deform to a greater extent than the third and fourth inner links under the same loading.

9. The chain as recited in claim 1 wherein the single middle link is C65 steel and the first and second inner links are C45 steel.

10. A chain for a timing drive or an assembly drive of a drive device of a motor vehicle, comprising a plurality of links, the links comprising:
    a plurality of link packs articulatedly connected to one another and formed from middle links and cover links, with corresponding recesses through which chain pins or chain sleeves are inserted, the link packs including a first link pack including a first link pack middle link, a first cover link and a second cover link, and
    a plurality of inner links which connect the link packs to one another, the plurality of inner links including a first inner link directly laterally adjacent to the first cover link and a second inner link directly laterally adjacent to the second cover link, the first inner link being laterally between the first link pack middle link and the first cover link, the second inner link being laterally between the first link pack middle link and the second cover link,
    wherein the first link pack middle link exhibits lower expansion behavior than each of the first and second inner links such that the first and second inner links each elastically deform to a greater extent than the first link pack middle link under a same loading, wherein the lower expansion behavior is realized by the first and second inner links being a different material than the first link pack middle link, wherein the first link pack middle link is rotationally fixedly connected to the respective chain pin or chain sleeve and the first and second inner links are each held to the respective chain pin or chain sleeve in a rotatable manner.

11. The chain as recited in claim 10 wherein the plurality of inner links further include a third inner link directly laterally adjacent to the first inner link and the first link pack middle link and a fourth inner link directly laterally adjacent to the second inner link and the first link pack middle link.

12. The chain as recited in claim 11 wherein the third and fourth inner links each exhibit lower expansion behavior than each of the first and second inner links such that the first and second inner links each elastically deform to a greater extent than the third and fourth inner links under the same loading.

13. The chain as recited in claim 10 wherein the first link pack middle link is C65 steel and the first and second inner links are C45 steel.

14. The chain as recited in claim 10 wherein the first link pack middle link consists of a single middle link.

* * * * *